(12) United States Patent
Carneiro da Cunha et al.

(10) Patent No.: US 12,657,877 B2
(45) Date of Patent: Jun. 16, 2026

(54) MACHINE LEARNING USING CATEGORICAL UNCERTAINTY SAMPLING

(71) Applicant: Lenovo (Singapore) Pte. Ltd., Singapore (SG)

(72) Inventors: Lucas Cabral Carneiro da Cunha, Centro (BR); Victor Aguiar Evangelista de Farias, Fortaleza (BR); Lucas Beserra de Sena, Lagoa Redonda (BR); Javam de Castro Machado, Fortaleza (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 268 days.

(21) Appl. No.: 18/617,206

(22) Filed: Mar. 26, 2024

(65) Prior Publication Data

US 2025/0308210 A1     Oct. 2, 2025

(51) Int. Cl.
*G06V 10/771*       (2022.01)
*G06V 10/774*       (2022.01)

(52) U.S. Cl.
CPC ........ *G06V 10/771* (2022.01); *G06V 10/7753* (2022.01)

(58) Field of Classification Search
None
See application file for complete search history.

(56) References Cited

U.S. PATENT DOCUMENTS

| | | | |
|---|---|---|---|
| 2022/0036135 A1* | 2/2022 | Hu | G06V 20/70 |
| 2022/0207866 A1* | 6/2022 | Li | G06V 20/70 |
| 2022/0237788 A1* | 7/2022 | Shaul | G16H 50/70 |

* cited by examiner

*Primary Examiner* — Edward Park
(74) *Attorney, Agent, or Firm* — Schwegman Lundberg & Woessner, P.A.

(57) ABSTRACT

A system identifies and selects the best image to use to retrain a machine learning algorithm, thereby creating the best model. The best image is identified by determining the image, in an object identification, that has the most uncertainty. In addition to determining uncertainties for images, the system uses priority scores, groupings and orderings of subsets of images by the priority scores, computing a complement of recall or difficulty measure, and selecting images based on the difficulty measure.

11 Claims, 2 Drawing Sheets

MACHINE LEARNING USING CATEGORICAL UNCERTAINTY SAMPLING

TECHNICAL FIELD

Embodiments described herein generally relate to the training of machine learning algorithms used in image object detection, and in an embodiment, but not by way of limitation, the identification of images to be used for retraining machine learning algorithms based on uncertainties.

BACKGROUND

Machine learning algorithms can be trained and retrained to, for example, recognize objects in images. However, this training and retraining can require tremendous amounts of time, processor cycles and data. The art would therefore benefit from a more efficient method to train such machine learning algorithms.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
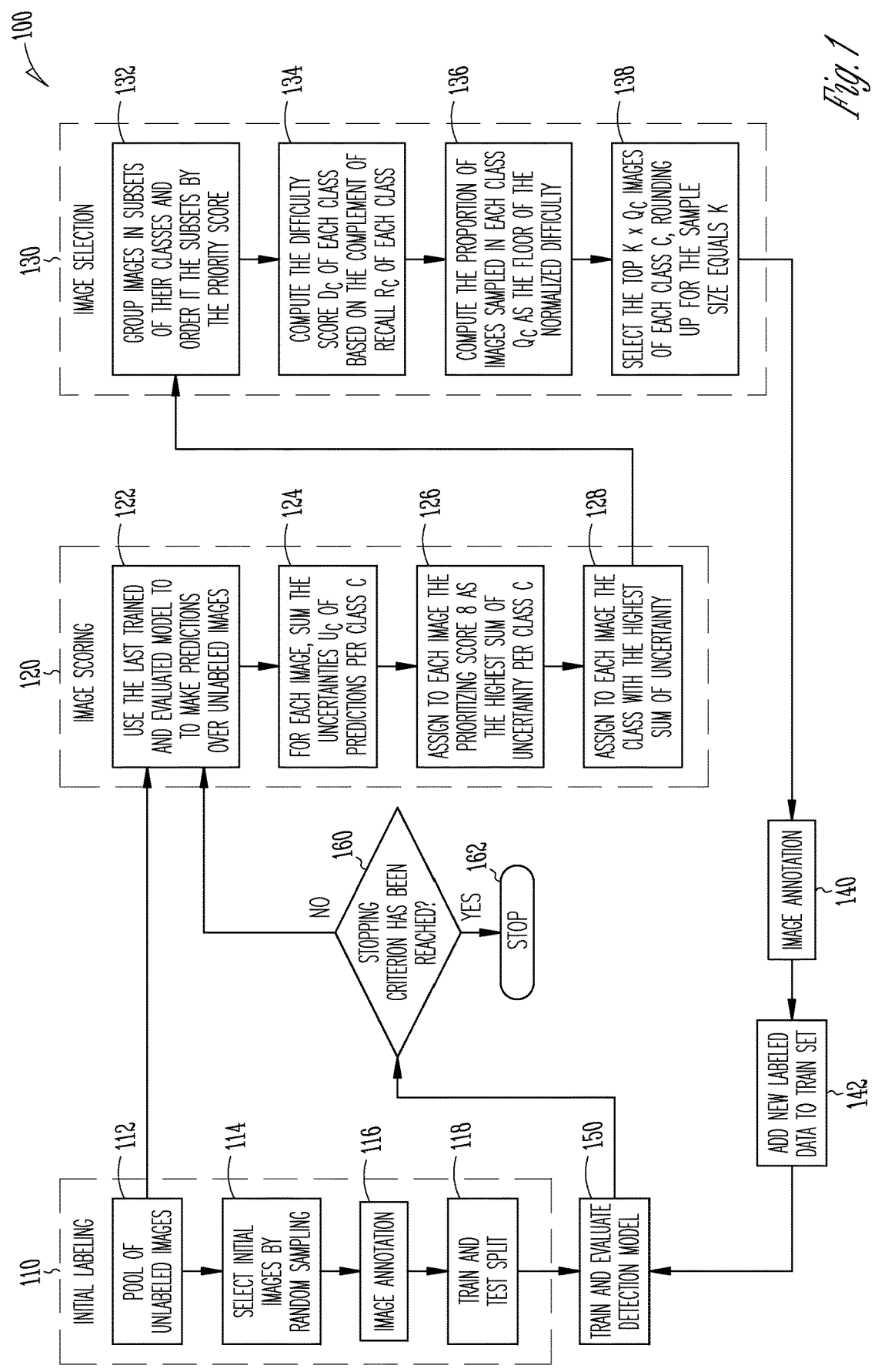
FIG. 1 is a block diagram of a system and method to train an object identification machine learning algorithm based on uncertainties in images.

FIG. 1 is a block diagram of a system and method 100 to train an object identification machine learning algorithm based on uncertainties in images. In short, the system and process aim to select the best image, that is the image with the most uncertainty, to train and retrain the algorithm and create the best model.

Referring specifically to FIG. 1, images are scored at 120. At 122, a model that was trained using a plurality of images is received, considered and used. As indicated at 122, the model is a continuously and most recently trained and evaluated model to make predictions over unlabeled images. As indicated at operations 110 and 112-118, there is an initial labeling of the images. At 112, there exists a pool of unlabeled images. Initial images are selected by random sampling at 114, and then annotated at 116. Different objects in the images are annotated as the class of objects to which they belong. For example, the different objects can be different classes of land vehicles including cars, trucks, and tanks. These annotated images are then used to train the model and split the images into the different classes at 118.

The trained model is then evaluated at 150, computing the recall of each class, and it is determined at 160 if this trained and evaluated model meets one or more certain stopping criteria. For example, a stopping criterion could be that the retrained model has an error below a certain threshold. If the model meets the stopping criteria, the retraining can cease at 162. If the model does not meet the stopping criteria, the model is further trained by providing additional images to operation 122, which is the beginning of image scoring 120.

Operations 122-128 encompass the image scoring process 120. As noted above, part of operation 122 is the receipt for processing of a plurality of unlabeled images, and these unlabeled images are provided to the model for further retraining of the model. At 124, for each unlabeled image, the uncertainties of the predictions for each class are summed. The uncertainty of a prediction i is defined as $u_i=1-p_c$, where $p_c$ is the highest predicted probability of the probability distribution outputted by the model, i.e, the confidence score of the prediction belonging to class C. The categorical uncertainties $u_c$ of each class C are calculated as the summation of the uncertainties of all predictions belonging to class $$C, \text{ i.e, } u_C = \sum_{i=1}^{n} u_i,$$

where $u_i \in C$. That is, uncertainties are received for each different object in the images under consideration, and these uncertainties are summed for each object class. At 126, each image is assigned a priority score. The priority score is calculated for each image; not for each class in the image. The priority score is the largest categorical uncertainty score in the image. For example, if the categorical uncertainty in an image for a car is 20, for a truck is 30, and for a tank is 40, the priority score for the image is 40, that is, the largest categorical uncertainty. Also, as indicated at 128, each image is assigned to the class of object that has the highest categorical uncertainty. It is noted that in object detection tasks, images can contain objects of multiple classes, but in this method an image is assigned to one class for later retrieving images that are representative of objects of each class. Referring again to the example, the image will be assigned to the tank class of objects because it has the highest summed categorical uncertainty.

Thereafter, images are selected at 130, which includes operations 132-138. At 132, the images are grouped into subsets of the assigned object classes. That is, for example, all the images assigned as belonging to the class car are grouped into a first subset, all the images assigned as belonging to the class truck are grouped into a second subset, and all the images assigned as belonging to the class tank are grouped into a third subset. Each image in the subsets is then ordered by the priority score that is associated with that particular image.

At 134, a difficulty score is computed for each class of objects based on the well-known pattern recognition metric of recall, which is the proportion of correctly detected objects of the total of existing objects in all images. For each class C, the difficulty score is calculated as $d_c=1-R_c$, where $R_c$ is the recall of class C. The difficulty score (complement) is for each class (each vehicle) in the image; it is not for each image. At 136, the number of images $q_c$ that will be sampled in each class is computed as the floor of the normalized difficulty, multiplied by the user defined sample size K. For example, if K=100, the class car's difficulty score is 0.4, the class truck's 0.2 and the class tank's 0.7, so $$q_{car} = \text{floor}\left(\frac{0.4}{0.4 + 0.7 + 0.2} \times 100\right) = 30,$$

$$q_{truck} = \text{floor}\left(\frac{0.2}{0.4 + 0.7 + 0.2} \times 100\right) = 15,$$

and

-continued $$q_{tank} = \text{floor}\left(\frac{0.7}{0.4 + 0.7 + 0.2} \times 100\right) = 53.$$

At 138, the top $q_c$ images of each object class are selected. The number of images selected is based on the number of images sampled in each class and a user selected constant K. In other words, a number of images from each of the subsets is selected based on the difficulty score for each of the subsets. The number of selected images is rounded up in the class with the highest difficulty score so the sample size equals K. In the last example, $q_{tank}$ should be rounded up to 55. At 140, these selected images are annotated, and at 142, these newly annotated or labeled data are provided to retrain the model at 150.

Figure 2:
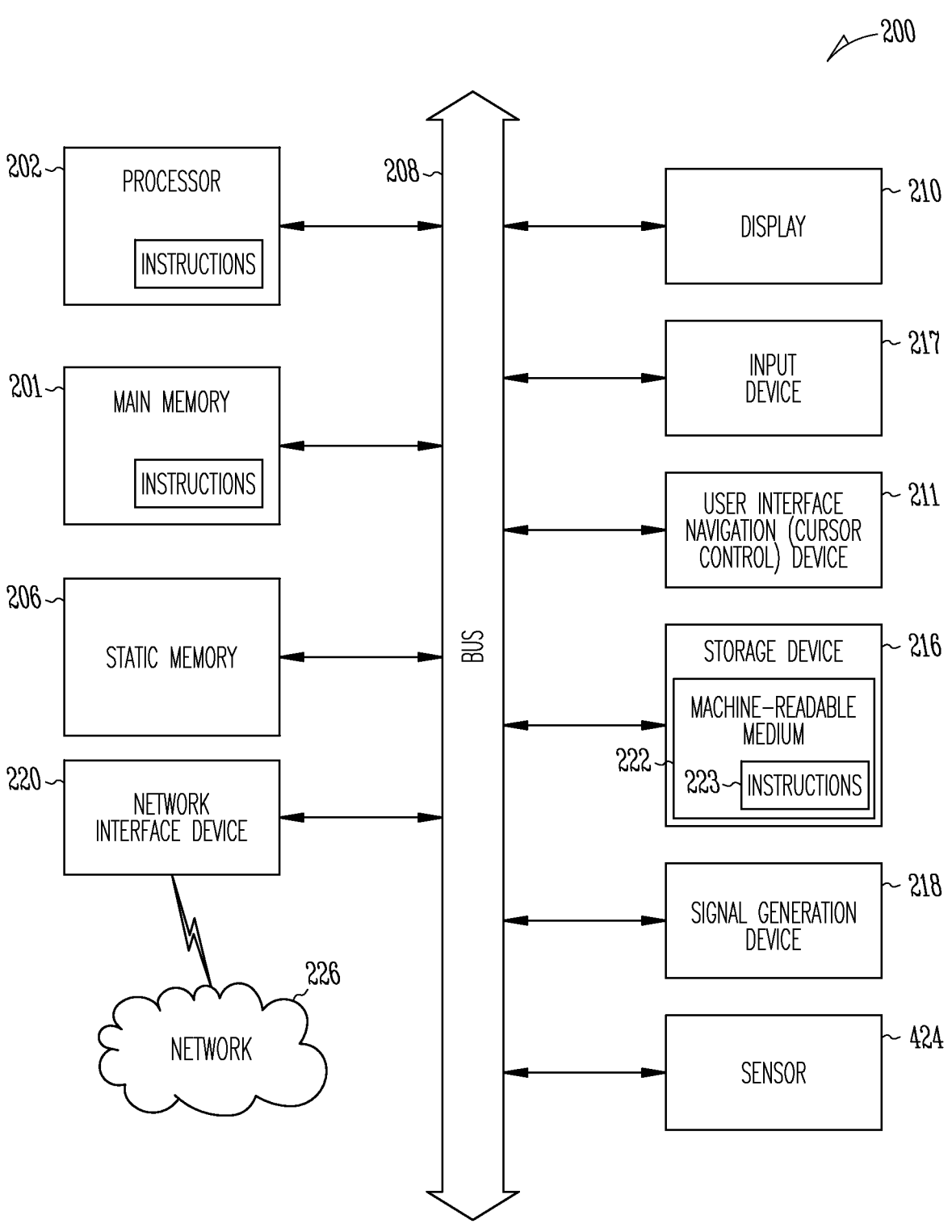
FIG. 2 is a block diagram of a computer architecture upon which one or more embodiments can execute.

FIG. 2 is a block diagram illustrating a computing and communications platform 200 in the example form of a general-purpose machine on which some or all the operations of FIG. 1 may be carried out according to various embodiments. In certain embodiments, programming of the computing platform 200 according to one or more particular algorithms produces a special-purpose machine upon execution of that programming. In a networked deployment, the computing platform 200 may operate in the capacity of either a server or a client machine in server-client network environments, or it may act as a peer machine in peer-to-peer (or distributed) network environments.

Example computing platform 200 includes at least one processor 202 (e.g., a central processing unit (CPU), a graphics processing unit (GPU) or both, processor cores, compute nodes, etc.), a main memory 201 and a static memory 206, which communicate with each other via a link 208 (e.g., bus). The computing platform 200 may further include a video display unit 210, input devices 217 (e.g., a keyboard, camera, microphone), and a user interface (UI) navigation device 211 (e.g., mouse, touchscreen). The computing platform 200 may additionally include a storage device 216 (e.g., a drive unit), a signal generation device 218 (e.g., a speaker), a sensor 224, and a network interface device 220 coupled to a network 226.

The storage device 216 includes a non-transitory machine-readable medium 222 on which is stored one or more sets of data structures and instructions 223 (e.g., software) embodying or utilized by any one or more of the methodologies or functions described herein. The instructions 223 may also reside, completely or at least partially, within the main memory 201, static memory 206, and/or within the processor 202 during execution thereof by the computing platform 200, with the main memory 201, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 223. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

EXAMPLES

Example No. 1 is a process comprising the operations of receiving a model trained using a plurality of images; receiving a plurality of unlabeled images; providing the plurality of unlabeled images to the model; receiving uncertainty scores from the model for each of the plurality of unlabeled images and for each occurrence of a particular class in each of the plurality of unlabeled images; summing the uncertainty scores for each occurrence of the particular class in each of the plurality of unlabeled images; assigning to each unlabeled image a priority score, the priority score comprising a largest uncertainty score of the particular classes in each unlabeled image; associating with each of the plurality of unlabeled images the particular class having a largest priority score; grouping the plurality of unlabeled images into subsets, each subset associated with a same particular class; ordering the subsets by the priority score; computing a complement of recall for each subset, thereby generating a difficulty score for each subset; selecting a number of images from each of the subsets based on the difficulty score for each of the subsets; and retraining the model with the selected number of images from each of the subsets.

Example No. 2 includes all the features of Example No. 1, and optionally includes a process wherein the uncertainty of each unlabeled image comprises an uncertainty of predictions for each of the particular classes of the unlabeled images.

Example No. 3 includes all the features of Example Nos. 1-2, and optionally includes a process comprising annotating and labeling a portion of the plurality of unlabeled images from the subset with the lowest difficulty score.

Example No. 4 is a machine-readable medium comprising instructions that when executed by a processor executes a process comprising the operations of receiving a model trained using a plurality of images; receiving a plurality of unlabeled images; providing the plurality of unlabeled images to the model; receiving uncertainty scores from the model for each of the plurality of unlabeled images and for each occurrence of a particular class in each of the plurality of unlabeled images; summing the uncertainty scores for each occurrence of the particular class in each of the plurality of unlabeled images; assigning to each unlabeled image a priority score, the priority score comprising a largest uncertainty score of the particular classes in each unlabeled image; associating with each of the plurality of unlabeled images the particular class having a largest priority score; grouping the plurality of unlabeled images into subsets, each subset associated with a same particular class; ordering the subsets by the priority score; computing a complement of recall for each subset, thereby generating a difficulty score for each subset; selecting a number of images from each of the subsets based on the difficulty score for each of the subsets; and retraining the model with the selected number of images from each of the subsets.

Example No. 5 includes all the features of Example No. 4, and optionally includes a machine readable medium wherein the uncertainty of each unlabeled image comprises an uncertainty of predictions for each of the particular classes of the unlabeled images.

Example No. 6 includes all the features of Example Nos. 4-5, and optionally includes a machine readable medium comprising instructions for annotating and labeling a portion of the plurality of unlabeled images from the subset with the lowest difficulty score.

Example No. 7 is a process comprising providing a plurality of unlabeled images to a model, the model trained using a plurality of images; receiving uncertainty scores from the model; summing the uncertainty scores; assigning to each unlabeled image a priority score; associating with each of the plurality of unlabeled images a particular class having a largest priority score; grouping the plurality of unlabeled images into subsets; ordering the subsets by the priority score; computing a complement of recall for each subset, thereby generating a difficulty score for each subset; and selecting a number of images from each of the subsets based on the difficulty score for each of the subsets.

Example No. 8 includes all the features of Example No. 7, and optionally includes a process comprising retraining the model with the selected number of images from each of the subsets.

Example No. 9 includes all the features of Example Nos. 7-8, and optionally includes a process wherein the uncertainty scores received from the model are for each of the plurality of unlabeled images and for each occurrence of a particular class in each of the plurality of unlabeled images.

Example No. 10 includes all the features of Example Nos. 7-9, and optionally includes a process wherein the uncertainty scores are summed for each occurrence of the particular class in each of the plurality of unlabeled images.

Example No. 11 includes all the features of Example Nos. 7-10, and optionally includes a process wherein the priority score comprises a largest uncertainty score of the particular classes in each unlabeled image.

Example No. 12 includes all the features of Example Nos. 7-11, and optionally includes a process wherein each subset is associated with a same particular class.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process comprising:
receiving a model trained using a plurality of images;
receiving a plurality of unlabeled images;
providing the plurality of unlabeled images to the model;
receiving uncertainty scores from the model for each of the plurality of unlabeled images and for each occurrence of a particular class in each of the plurality of unlabeled images;
summing the uncertainty scores for each occurrence of the particular class in each of the plurality of unlabeled images;
assigning to each unlabeled image a priority score, the priority score comprising a largest uncertainty score of the particular classes in each unlabeled image;
associating with each of the plurality of unlabeled images the particular class having a largest priority score;
grouping the plurality of unlabeled images into subsets, each subset associated with a same particular class;
ordering the images of subsets by the priority score;
computing a complement of recall for each subset, thereby generating a difficulty score for each subset;
selecting a number of images from each of the subsets based on the difficulty score for each of the subsets; and
retraining the model with the selected number of images from each of the subsets.

2. The process of claim 1, wherein the uncertainty of each unlabeled image comprises an uncertainty of predictions for each of the particular classes of the unlabeled images.

3. A non-transitory machine-readable medium comprising instructions that when executed by a processor executes a process comprising:
receiving a model trained using a plurality of images;
receiving a plurality of unlabeled images;
providing the plurality of unlabeled images to the model;

receiving uncertainty scores from the model for each of the plurality of unlabeled images and for each occurrence of a particular class in each of the plurality of unlabeled images;

summing the uncertainty scores for each occurrence of the particular class in each of the plurality of unlabeled images;

assigning to each unlabeled image a priority score, the priority score comprising a largest uncertainty score of the particular classes in each unlabeled image;

associating with each of the plurality of unlabeled images the particular class having a largest priority score;

grouping the plurality of unlabeled images into subsets, each subset associated with a same particular class;

ordering images of the subsets by the priority score;

computing a complement of recall for each subset, thereby generating a difficulty score for each subset;

selecting a number of images from each of the subsets based on the difficulty score for each of the subsets; and retraining the model with the selected number of images from each of the subsets.

4. The non-transitory machine-readable medium of claim 3, wherein the uncertainty of each unlabeled image comprises an uncertainty of predictions for each of the particular classes of the unlabeled images.

5. The non-transitory machine-readable medium of claim 3, comprising annotating and labeling a portion of the plurality of unlabeled images from the subset with the lowest difficulty score.

6. A process comprising:

providing a plurality of unlabeled images to a model, the model trained using a plurality of images;

receiving uncertainty scores from the model;

summing the uncertainty scores;

assigning to each unlabeled image a priority score;

associating with each of the plurality of unlabeled images a particular class having a largest priority score;

grouping the plurality of unlabeled images into subsets;

ordering the subsets by the priority score;

computing a complement of recall for each subset, thereby generating a difficulty score for each subset; and selecting a number of images from each of the subsets based on the difficulty score for each of the subsets.

7. The process of claim 6, comprising retraining the model with the selected number of images from each of the subsets.

8. The process of claim 6, wherein the uncertainty scores received from the model are for each of the plurality of unlabeled images and for each occurrence of a particular class in each of the plurality of unlabeled images.

9. The process of claim 6, wherein the uncertainty scores are summed for each occurrence of the particular class in each of the plurality of unlabeled images.

10. The process of claim 6, wherein the priority score comprises a largest uncertainty score of the particular classes in each unlabeled image.

11. The process of claim 6, wherein each subset is associated with a same particular class.

* * * * *